United States Patent [19]

Brogårdh et al.

[11] Patent Number: 4,475,240
[45] Date of Patent: Oct. 2, 1984

[54] DEVICE FOR SIMULTANEOUS CREATION AND DETECTION OF MARKINGS

[75] Inventors: Torgny Brogårdh; Christer Ovren, both of Västerås, Sweden

[73] Assignee: ASEA Aktiebolag, Västerås, Sweden

[21] Appl. No.: 319,649

[22] Filed: Nov. 9, 1981

[30] Foreign Application Priority Data

Nov. 10, 1980 [SE] Sweden .................................. 8007873

[51] Int. Cl.³ .......................... G06K 9/22; G06K 9/00
[52] U.S. Cl. ............................................. 382/59; 382/3
[58] Field of Search .......................... 382/3, 13, 59, 17; 178/18–20; 250/216, 227, 566, 567, 96.1, 96.24, 111, 380; 356/222, 369, 419, 435, 406, 407, 416; 358/285, 294, 94, 200; 235/491, 455, 454, 472

[56] References Cited

U.S. PATENT DOCUMENTS

| | | | |
|---|---|---|---|
| 3,182,291 | 5/1965 | Nassimbene | 382/59 |
| 3,335,287 | 8/1967 | Hargens | 250/227 |
| 3,473,027 | 10/1969 | Freeman et al. | 235/491 |
| 3,576,430 | 4/1971 | Fickensher | 235/473 |
| 3,801,182 | 4/1974 | Jones | 356/369 |
| 3,912,860 | 10/1975 | Sasabe et al. | 178/18 |
| 4,128,829 | 12/1978 | Herbst | 382/3 |
| 4,202,491 | 5/1980 | Suzuki | 235/491 |
| 4,279,465 | 7/1981 | Vojvodich | 250/227 |

OTHER PUBLICATIONS

IBM Technical Disclosure Bulletin, vol. 22, No. 8A, Jan. 1980, Bassetti et al.
IBM Technical Disclosure Bulletin, vol. 14, No. 4, Sep. 1971, Holdaway.

Primary Examiner—John C. Martin
Assistant Examiner—Michael D. Parker
Attorney, Agent, or Firm—Watson, Cole, Grindle & Watson

[57] ABSTRACT

Device for simultaneous generation and detection of markings (e.g. handwriting) comprising at least one marking member and at least one optical sensor, which is arranged to sense at least one optical property of the surface on which the marking is being made, the marking member being arranged to change said at least one property of the surface on which the marking is made, said optical sensor being arranged to sense the direction of said marking relative to the orientation of the device.

5 Claims, 31 Drawing Figures

DEVICE FOR SIMULTANEOUS CREATION AND DETECTION OF MARKINGS

TECHNICAL FIELD

The present invention relates to a device for the simultaneous generation and detection of markings (which may or may not be permanent), comprising at least one marking member and at least one optical sensor, which is arranged to sense at least one optical property of the surface on which the marking is being made, the marking member being arranged to change permanently or temporarily said at least one property of the surface on which the marking is made and said optical sensor being arranged to sense the direction of said marking relative to the orientation of the marking member.

Throughout this specification the term "marking" is used to indicate any form of permanent mark on a surface (such as is caused, for example, by a pigment, localised melting or scratching) or any form of temporary mark (such as is caused, for example by a powder deposit, a fadeable dye, phosphorescence or luminescence) and includes a localised detectable change in an optical property of the marked surface which is not, or not readily, visible to the naked eye under normal ambient illumination.

DISCUSSION OF PRIOR ART

A "bottle-neck" in the use of computer-based systems is the communication between man and the computer, that is, in the area of data input. Nowadays the use of keyboards of various types is totally dominating. This method for data input has the inherent drawback of requiring considerable operator training in order to be efficient, and furthermore there are difficulties in achieving simultaneous efficient processing of purely graphic information. Because of these problems, other methods for communication between man and machine are being developed, the principal methods in this connection being speech input and direct input of handwritten characters. In the case of speech input, the input member is a microphone, which is a technically well-developed component, whereas for input of handwritten information a great many proposals have been made how to sense the movement, speed and acceleration of the hand providing the input data.

The transducer described in this application is based on a previously known principle (see e.g. U.S. Pat. No. 3,182,291) involving the use of a specially constructed pen for the simultaneous generation and detection of markings, an optical sensor being arranged to sense the direction of the marking relative to the orientation of the marking member (e.g. a pen). With the prior art technical solutions, the detector signal is greatly dependent on the distance between the optical sensor and the surface on which the marking is being made, the inclination of the pen, light from reading lamps, fouling of the sensor, etc. These potential sources of error impose great demands on the way in which the user holds the marking member against the surface on which the marking is being made, on the ambient lighting conditions, on how often the tip of the marking member is cleaned, and so on, and therefore this type of transducer for input of handwritten information has never been widely used.

The present invention relates to a device which is capable of completely eliminating all the above-mentioned problems. The invention is characterised in that the optical properties of the surface affected by the marking includes at least one of the light absorption spectrum, the light reflection spectrum, the light transmission spectrum, the light polarization and the light luminescence of the surface to be marked. With modern optical and opto-electronic components such as laser diodes, light-emitting diodes, photodiodes, optical fibers, optical branches and optical interference filters, which may be manufactured in micro-size, at a low price and in great volumes for installation in thin, light and convenient marking members, a very accurate detection of the direction of the marking relative to the orientation of the marking member is made, according to the invention, without any dependence on the distance from the tip of the marking member to the underlay, the inclination of the marking member, the ambient light, the fouling of the tip, etc. This accuracy of detection may be achieved by introducing means for spectral selection between the marking and the surface on which the marking is being made. Thus, the direction of the marking relative to the orientation of the marking member can be measured by sensing the light absorption spectrum, the light reflection spectrum, the light transmission spectrum and/or the light luminescence over at least one area adjacent the tip on the surface where the marking is occurring.

BRIEF DESCRIPTION OF DRAWINGS

The invention will now be exemplified, in greater detail, by way of example, with reference to the accompanying drawings, in which.

DESCRIPTION OF PREFERRED EMBODIMENTS

In principle, a device according to the invention may comprise three main components, a marking member, a sensor and an electronic unit. The marking member performs some form of mark on a medium, which causes at least one physical or chemical property of the medium to be changed where the marking is made. The sensor senses the property of said medium and detects, during the whole generation or parts of the generation of the marking, the direction of the marking on the medium in relation to a reference direction of the marking member, said reference direction extending parallel to the tangential surface of the medium. In this way, the sensor signal constitutes a more or less accurate measure of the direction of the marking in relation to the marking member. When the mark being made coincides with or intersects an earlier mark, said signal also constitutes a measure of the direction or directions of these earlier marks relative to the marking member, while at the same time a significant detection of coinciding or intersecting marks is obtained. The electronic unit may comprise electronic circuits for analysis of the sensor signal when the marking member is displaced. This analysis can be based on known pattern recognition methods and extracts from the sensor signal or signals, the whole of or parts of the marking information for presentation in electrical, optical or mechanical form. In one application, the marking member may be controlled by a human hand, the marking member and the sensor then being mechanically connected to each other. The object of invention may, for example, consist of a device for simultaneous marking and sensing of marks made, in which the marking is carried out by changing the optical properties of the material to be marked, and in which the detection is carried out by an optical detector system built into the device. The spectral composition of the light can be analyzed, in which case absorption, transmission and luminescence spectra are utilized to accurately detect the direction, width, strength and curvature of the mark made.

Figure 1:
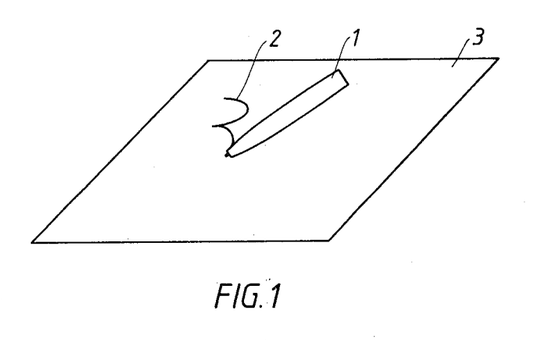
FIGS. 1, 2 and 4a are schematic representations of the basic principle employed in a device according to the invention for sensing the direction of a marking.

FIG. 1 shows a device 1 for the simultaneous creation and sensing of a mark 2, the creation of the mark being carried out by changing the optical properties of a material 3 on which the mark is made, and the sensing being carried out by an optical sensor system built into the device 1. At the mark 2, the light absorption, light reflection, light transmission, light polarization and/or light luminescence of the material 3 are changed where the mark has been made. The marking is carried out by using any convenient known technique, for example, by using a graphite point, a felt or nylon point for transfer of a liquid marking medium, a capillary point of fountain-pen or ink pen type, a ball point connected to a reservoir of a liquid marking medium, a thermal point, a jet of ink, a light beam, or a scribing point. In the following description of the drawings, points of ball-point type will be described (see 6 in FIG. 2), but in all the cases any other type of marking point may, in principle, be used.

Figure 2:
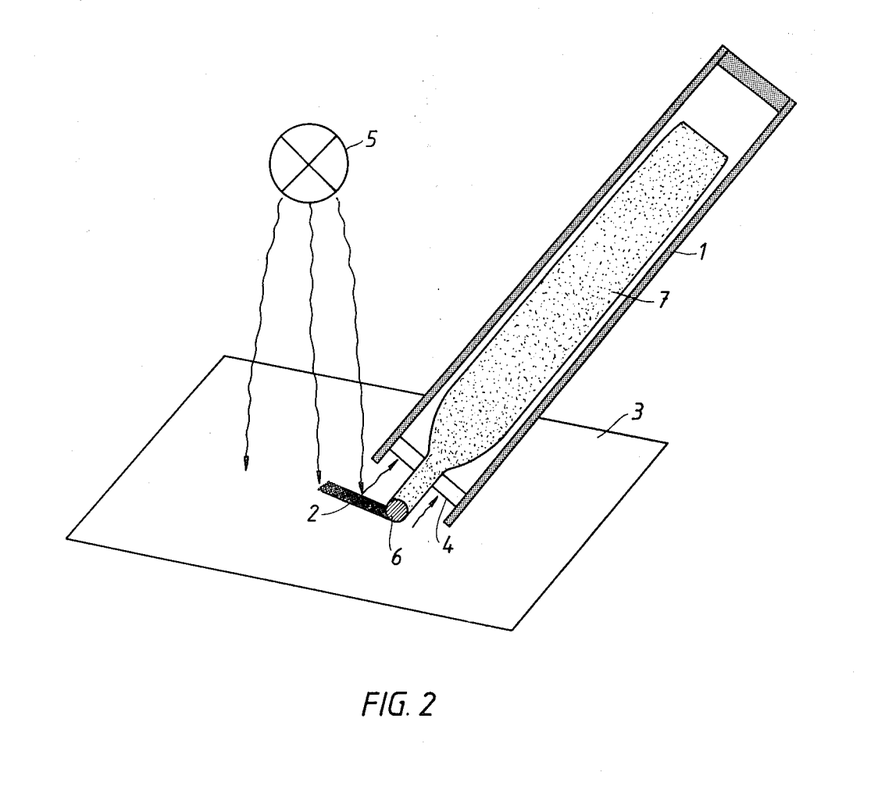

To continuously sense the mark made during the marking procedure, the marking device must be provided with a photo-detector arrangement, such as that exemplified schematically in FIG. 2. A photo-detector part 4 detects light reflected from the material 3 when an external light source 5 illuminates the material 3 from the same side on which the mark 2 is made. The mark 2 changes the reflection capacity, the light absorption property, the luminescence, the polarization and/or the optical transmission property of the material 3. To utilize a changed absorption and/or transmission capacity, the base of the material 3 may be reflecting or, alternatively, the underside of the material 3 may be provided with a reflecting layer. If the external light source 5 illuminates the material 3 from the opposite side to that on which the mark is made, which may be arranged by placing the light source 5 below transparent or translucent material 3 as shown in FIG. 2 or by employing a system of, for example, mirrors, prisms and/or light conductors, the photo-detector 4 will be able to measure directly the change in the optical absorption and/or transmission capacity of the material 3 caused by the mark. In FIG. 2 the marking member consists of a ball 6 which releases a marking medium at the correct rate from a refill cartridge 7.

The photo-detector part 4 may take a plurality of different forms, which are shown in FIGS. 3a to 3e, each of which represent a device 1 such as that shown in FIG. 2 as seen from the material 3 and in the direction of the longitudinal axis of the device 1. One or more light detectors 9 to 12 are mounted on a holder 8 which is attached to the device 1 via its casing and/or its refill cartridge 7 and/or by some other mechanical method.

Figure 3A:
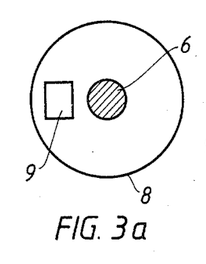
FIGS. 3a to 3e show details of five embodiments of the device of FIG. 2, FIGS. 4b and 4c show details of the device of FIG. 4a, FIGS. 5a to 5c, 6a to 6d, 7a and 7b and 8a and 8b show principles of the operation of a device according to the invention utilizing different sensing systems.
Figures 3B, 3C:
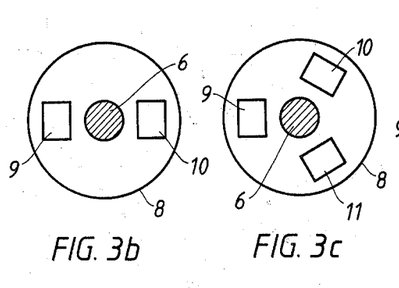
Figure 3D:
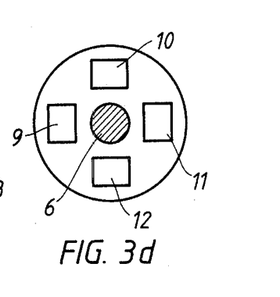

FIG. 3a shows the ball point 6 in the middle and one light detector 9 adjacent thereto. By introducing one, two or three additional detectors 10-12, positioned around the ball point 6 according to FIGS. 3b, 3c and 3d, a desired resolution can be obtained of the changes in the direction of the mark made relative to the orientation direction of the device 1. It is, of course, possible to use an arbitrary number of photo-detectors arranged in a ring around the ball point, in which case photo-detectors in the form of rows of diodes and/or CCD circuits may be used.

Figure 3E:
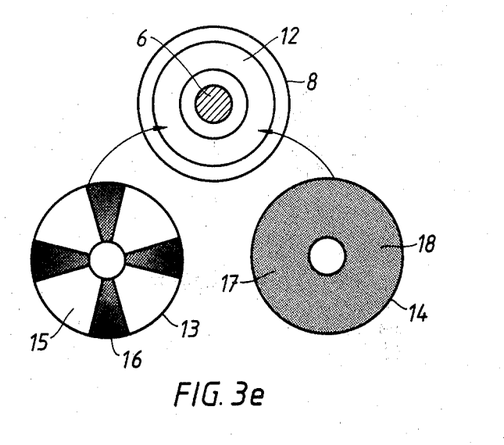

FIG. 3e shows an arrangement with an annular detector 12 around the point 6 which is used with a masking disc 13 (having clear sectors 15 and opaque sectors 16) and a filter disc 14 having a continuously varying light transmission which is smallest at 17 and greatest at 18.

Figure 13A:
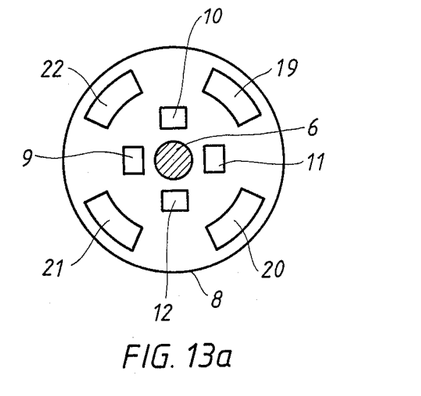
FIGS. 13a, 13b and 13c show still further modified detector arrangements for a device according to FIG. 2.
Figure 13B:
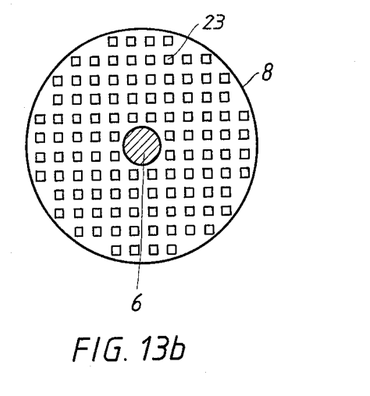
Figure 13C:
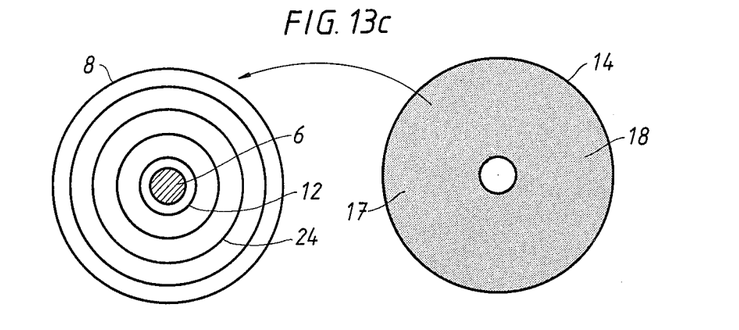

With the detector arrangements shown in FIGS. 3a to 3d, the direction of the mark made relative to the detector arrangement can be measured. By introducing further detectors at different distances in a radial direction from the ball point 6, the curvature of the mark made can also be detected. Examples of detector arrangements for this are shown in FIGS. 13a, 13b and 13c. In FIG. 13a, four outer detectors 19, 20, 21 and 22 are mounted on the holder 8, in addition to the detectors 9, 10, 11 and 12, whereby, for example, a straight mark moving past the detector 9 will only influence that detector, whereas an upwardly curved mark will also influence the outer detector 22. FIG. 13b shows an arrangement in which a mosaic of detectors 23 is used on the holder 8 around the ball point 6.

FIG. 13c shows a further detector arrangement in which annular detectors (e.g. 12 and 24) are disposed around the point 6, to sense the marked line at different radial distances from the point 6. The arrangement of FIG. 13c can be used with a filter 14 having the varying light transmission properties discussed with reference to FIG. 3e.

Figure 4A:
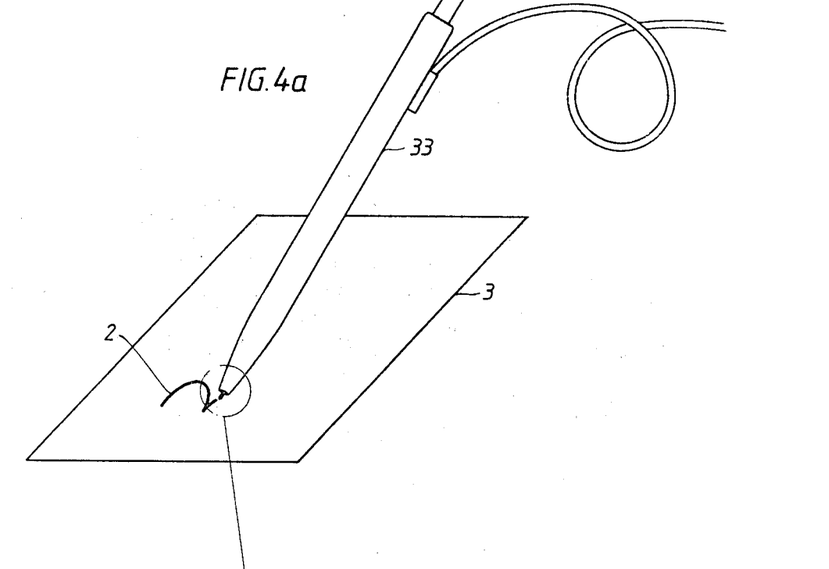
Figure 4B:
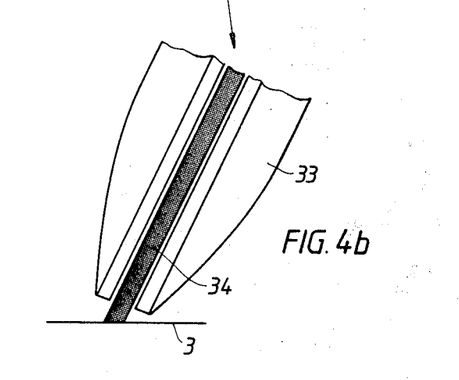
Figure 4C:
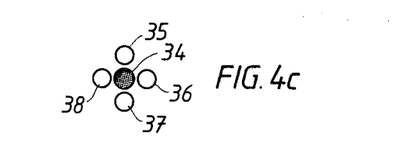

When the marking device 1 is to be moved by a human hand, it is desirable that the tip of the device with the marking and sensing members be as thin as possible in order not to obscure the mark made and so that the device will not be unwieldy to hold in the hand. To meet these requirements, thin optical fibres may be used, as is shown in FIGS. 4a, 4b and 4c. These Figures show a pen 33 in which the writing point 34 is surrounded, according to FIGS. 4b and 4c, by four light-conducting fibers 35, 36, 37 and 38, each of which may have as small a diameter as 10 $\mu$m. The number of light conductors used and their arrangement around the point 34 may be varied in many ways within the guidelines described above.

Figure 5A:
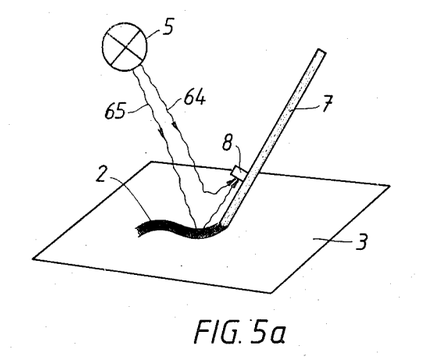
Figure 5B:
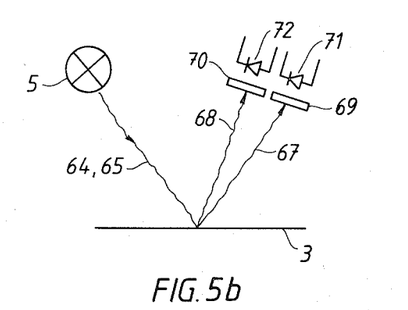
Figure 5C:
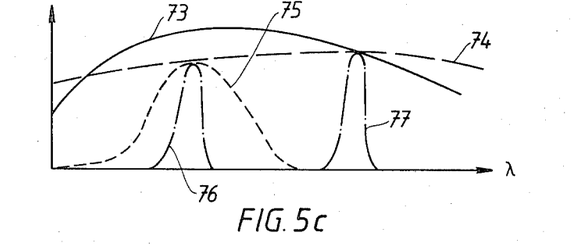

To overcome the sensitivity of mark detection to the inclination of the pen 33, to the length of the projecting point 34, or to fouling, etc., a spectral analysis of the light coming from the material 3 can be carried out. Such a spectral analysis may be carried out in a manner illustrated in FIGS. 5a, 5b and 5c. In FIG. 5a a support 8 on a cartridge 7 receives two light beams 64, 65 from the source 5, the first after reflection from the medium 3 and the second after reflection from the mark 2. As shown in FIG. 5b, each reflected light beam forms two partial rays 67 and 68, each of which passes through a respective optical filter 69 and 70 on its way to a respective detector 71 and 72. Examples of the spectral relationships which may be valid are shown in FIG. 5c. The light source 5 is here assumed to have a broad emission spectrum 73, the unmarked material 3, a broad reflection spectrum 74, the marked material 3, a narrower reflection spectrum 75, (e.g. corresponding to a marking colour) and the optical filters 69 and 70 are assumed to have narrow transmission spectra 76 and 77, respectively. As is clear from FIG. 5c, the detector signal from the detector 71 with the filter 69 having the filter characteristic 76 will not be appreciably changed by whether the ray 67 emanates from a reflection from a mark or not. On the other hand, the signal from the detector 72 will be very small if the ray 67 emanates from a reflection from a mark, since the reflection capacity of the mark is small in the characteristic wavelength range of the filter 70. With this arrangement, the signal from the detector 71 may be used as a reference signal.

Figure 6A:
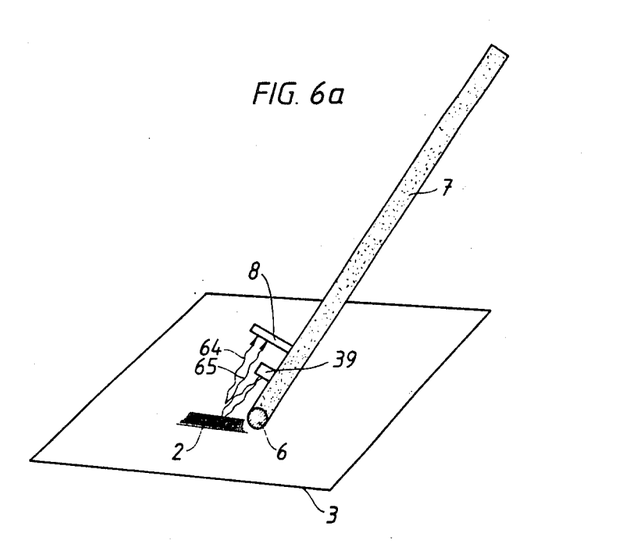
Figure 6B:
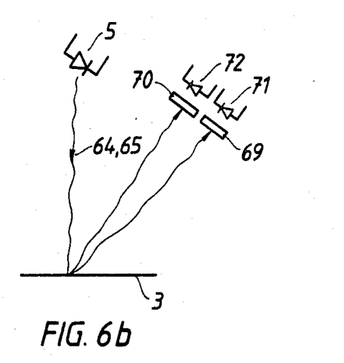
Figure 6C:
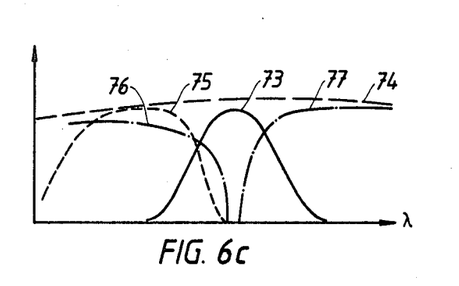
Figure 6D:
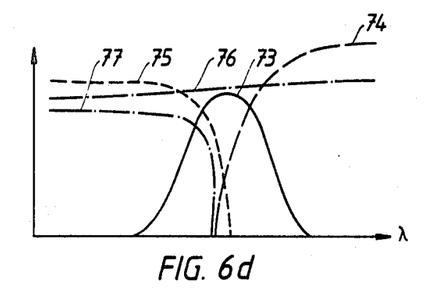

When a light source 39 is actually positioned on the marking means 7 (see FIG. 6a), it is most convenient to use light-emitting diodes or laser diodes, and thus obtain a narrow-band illumination. FIG. 6b shows schematically an example of light source and detector arrangements using light-emitting diodes and photo-diodes, respectively. The same designations and description used for FIG. 5b apply here also. Two examples of possible spectral relationships are indicated in FIGS. 6c and 6d, again using the same designations employed with reference to FIG. 5c. Many variants exist for the spectral relationships, but they all have one thing in common, namely that they extract at least two detector signals, of which one detector signal (via filter 69)—corresponding to the filter characteristic 76—has a smaller dependence on whether or not there is a mark 2 on the material 3 than the other detector signal. Since both detector signals have approximately the same dependence on the distance between the detector and the material 3, it is possible, for example by quotient formation between the signals from the two detectors, to obtain a signal which is only dependent on whether or not a mark has been sensed. It is of course possible to use more than two spectrally sensitive detectors, whereby the optical system can be made to carry out a more or less complicated spectral analysis of the light from the material 3.

Figure 7A:
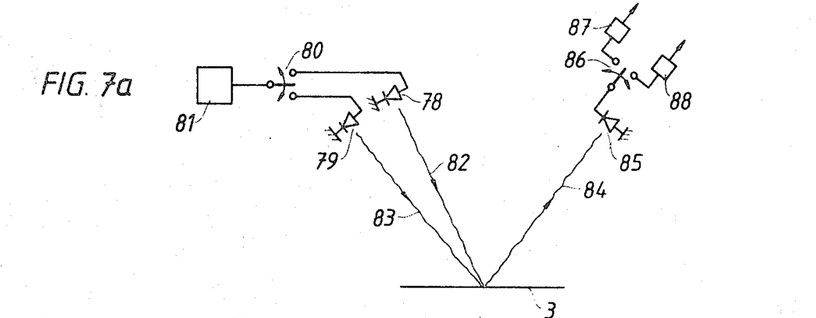
Figure 7B:
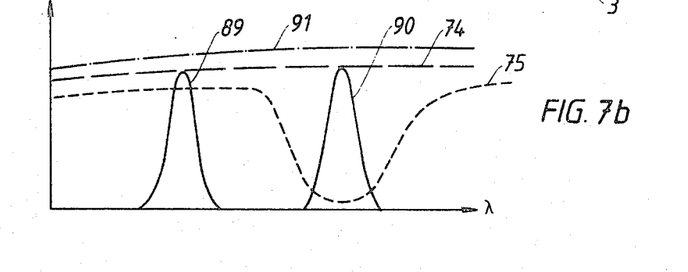

To perform the measurement at more than one wavelength interval, it is possible to use two or more light sources as shown in FIGS. 7a and 7b. Two light-emitting diodes (LEDs) 78 and 79 with the emission spectra 89 and 90, respectively, are coupled alternately to a current generator 81 via a switch 80. The emitted light rays 82 and 83 illuminate the same spot on the material 3, and one reflected light ray 84, emitted from the said spot, will alternatively contain light from the two LEDs 78 and 79. The composite light ray 84 is monitored by a photo-diode 85, the output signal of which is alternately connected into memory circuits 87 and 88 synchronously with the switching of the light sources, whereby the signal from the output of the memory circuit 87 is a measure of the light from the LED 78 as influenced by the material 3 and the signal from the memory circuit 88 is a measure of the light from the LED 79 as influenced by the material 3. This system thus employs time-division multiplexing. However, frequency-division multiplexing may also be used. An example of a spectral relationship for the system of FIG. 7a is shown in FIG. 7b. The LED 78 emits light having a spectrum 89, which is reflected both by the material 3 having a reflection spectrum 74 and by the mark 2 having a reflection spectrum 75. The LED 79 emits light having a spectrum 90, which is chosen so that the reflecting capacity 75 of the mark 2 is here lower than for the unmarked material 3. The spectral sensitivity curve 91 of the detector 85 is assumed to be substantially flat in FIG. 7b. It is of course possible to combine several light sources having different emission spectra with several detectors having different sensitivity spectra.

Figures 8A, 8B:
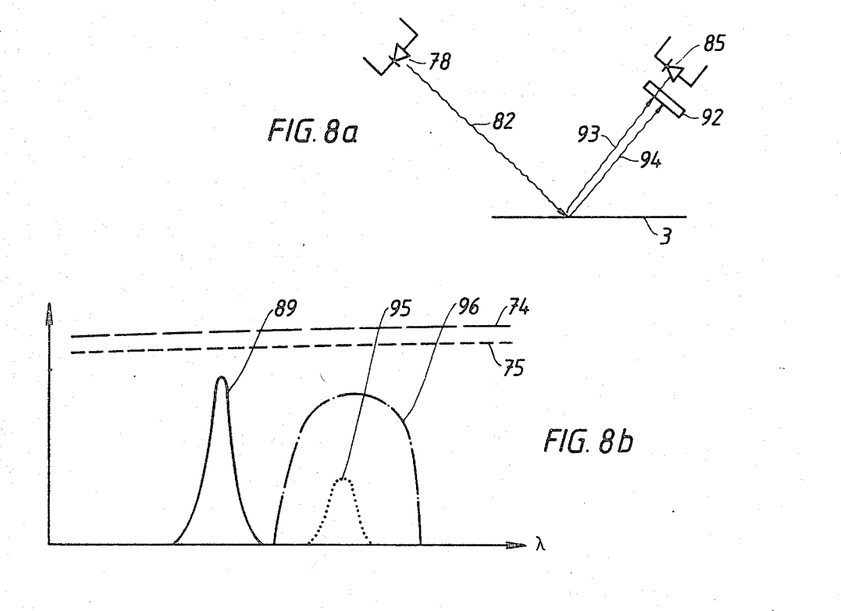

If the material 3 and/or the marks 2 on the material 3 are luminescent, this fact may be made use of not only for reducing the sensitivity of detection to the inclination of the marking member, the length of the point, or the fouling of the point, etc., but also for eliminating undesired reflections from, for example, the ball point. FIGS. 8a and 8b show an example of a further optical arrangement and the spectral relationships applicable thereto. The LED 78 emits light 82, having the spectral distribution 89, towards the material 3. The material 3 is assumed to have the same reflection capacity both with and without a broad reflection spectrum. Reflected light from the LED 78 is, however, blocked by an optical filter 92, which has a transmission curve 96, so the signal from the detector 85 is very small. However, if the mark contains a luminescent material having a luminescence spectrum 95, luminescent light is obtained which can freely pass the filter 92 and give rise to a detector signal.

By using some form of spectral analysis in the manner described with reference to FIGS. 5c, 6c, 6d, 7b or 8b, an accurate sensing of the mark made is obtained, whereby variations in the width and strength of the mark can also be detected. The width of the mark is determined by the relative detector signal values between different detectors, and the strength of the mark is determined by the absolute value of the individual detector signals.

Figure 15:
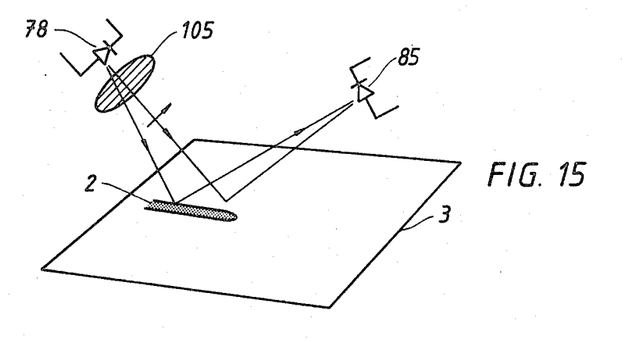
FIG. 15 shows the principle of operation using polarized light.

In addition to using spectral differences between the mark 2 and the unmarked material 3 in order to increase the detection accuracy, polarization differences in accordance with FIG. 15 may be used. In FIG. 15 the light from the LED 78 is polarized by a device 105, which is oriented so that reflections from the material 3 are almost eliminated. If the reflection quality of the mark 2 is independent of the polarization direction, light which illuminates the mark 2 will be reflected towards the detector 85.

Figure 14:
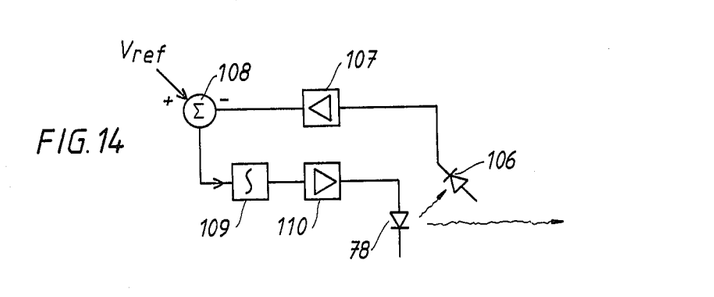
FIG. 14 shows a stabilizing system for a light source in a device according to the invention.

In all cases where an accurate optical detection is desired, the optical components should be temperature-stabilized. In addition, the light sources should be optically stabilized by employing an opto-electric feedback system such as that shown in FIG. 14. Part of the light from the LED 78 impinges on a detector 106, the output signal of which is amplified in an amplifier 107, is compared with a reference signal $V_{ref}$ in a comparison device 108, is controlled in a regulating device 109, and is amplified in a driver 110 of the light source to maintain the light emission of the latter constant.

Figure 9:
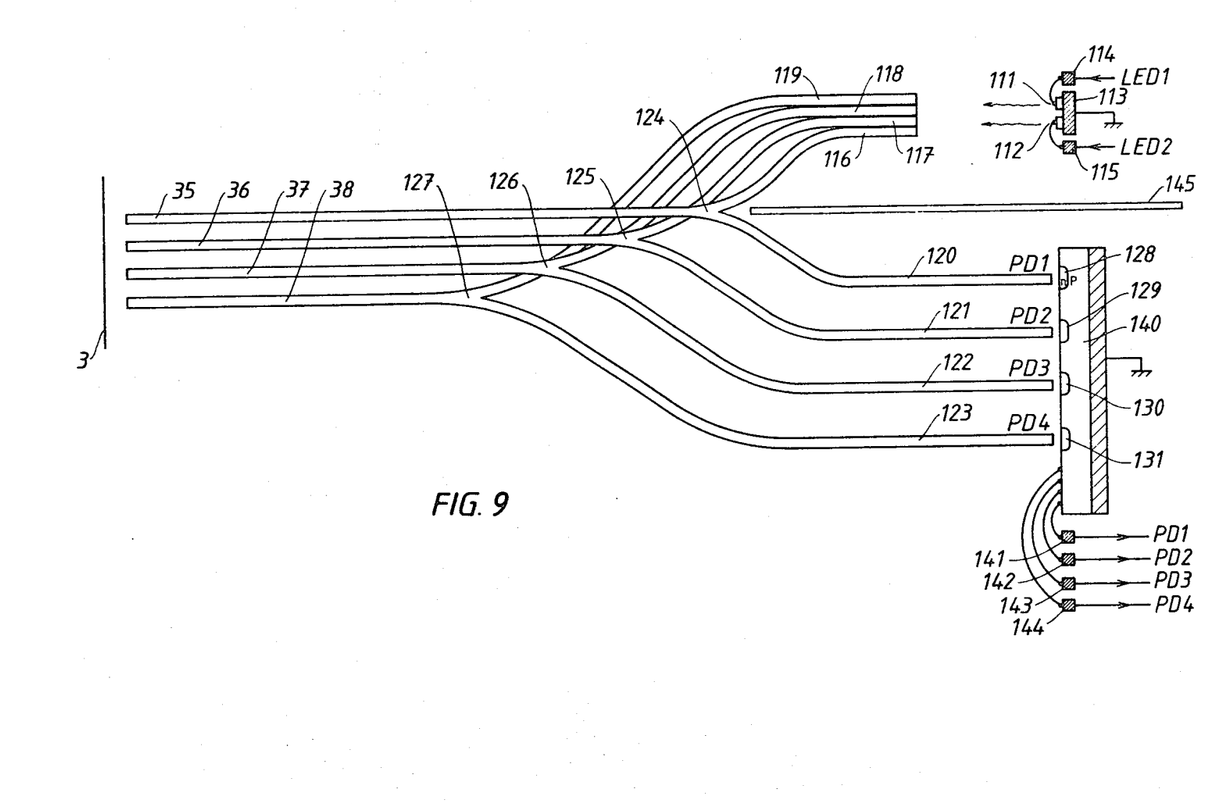
FIGS. 9 to 12 show details of the construction and operation of a complete system for the input of handwriting into a computer.

The manner in which the marking device functions will now be described with reference to the embodiment according to FIGS. 4a, 4b, 4c, which has a marking point 34, surrounded by four symmetrically positioned optical fibers 35, 36, 37 and 38. FIG. 9 shows one example of an optical arrangement of four optical fibers. Two LED chips 111 and 112 are mounted on a cooling plate 113 and are connected to power-supply contacts 114 and 115, respectively. Light from the LEDs 111 and 112 is led into the four fibers 116, 117, 118 and 119 and is passed, via branches 124, 125, 126 and 127, respectively, to the fibers 35, 36, 37 and 38, respectively. The light which is reflected back from the material 3 into the fibers 35-38, is passed to the branches 124-127, from which part of the light of the respective fiber is forwarded to fibers 120, 121, 122 and 123, respectively, and thence to photo-diodes 128, 129, 130 and 131, respectively. In this embodiment, the photo-diodes are integrated on a single semiconductor crystal 140, which also has a conduction pattern thereon which makes it possible to connect the four photo-diodes to terminal contacts 141, 142, 143 and 144, respectively. A screen 145 is provided to prevent light from leaking over directly from the LEDs 111 and 112 to the photo-diodes 128-131.

Figure 10:
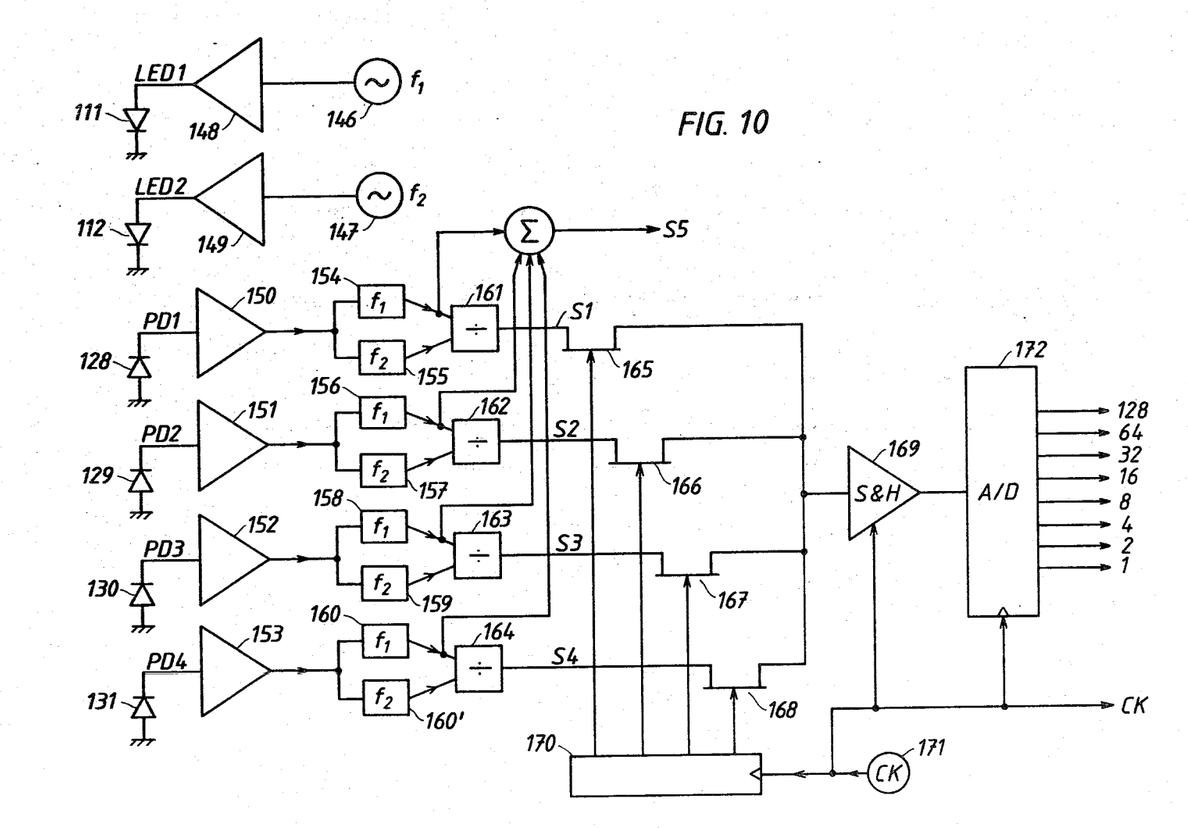

The LEDs and the photo-diodes are connected to a measuring electronic unit, one embodiment of which is shown in FIG. 10. Two oscillators 146 and 147 with different operating frequencies $f_1$ and $f_2$, respectively, supply the LEDs 111 and 112, respectively, via driver amplifiers 148 and 149, respectively. The emission spectra of the LEDs are wavelength separated and are selected as previously described in connection with FIG. 7b. The signals from the photo-detectors 128-131 are amplified in amplifiers 150-153 and are divided into the two frequency components $f_1$ and $f_2$ and then are demodulated by circuits 154-160'. To obtain signals S1, S2, S3 and S4, which are compensated for the inclination of the marking device 33 (see FIG. 4a), quotient formations are performed between the two signal components for each detector channel in respective quotient devices 161-164. To be able to evaluate the compensated detector signals in digital systems, there is provided an analog-to-digital converter 172, which is connected to a sample-and-hold circuit 169, which reads the signals S1-S4 in successive order via switches 165-168 which are controlled by a ring counter 170. This parallel/series connection, as well as the analog-to-digital conversion, is controlled by a clock 171.

Figure 11A:
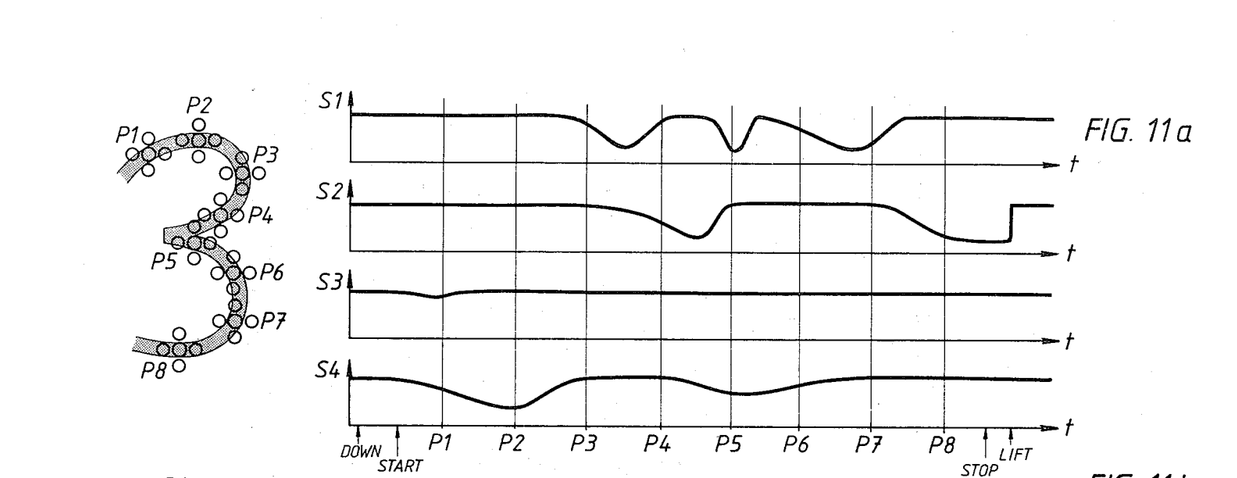
Figure 11B:
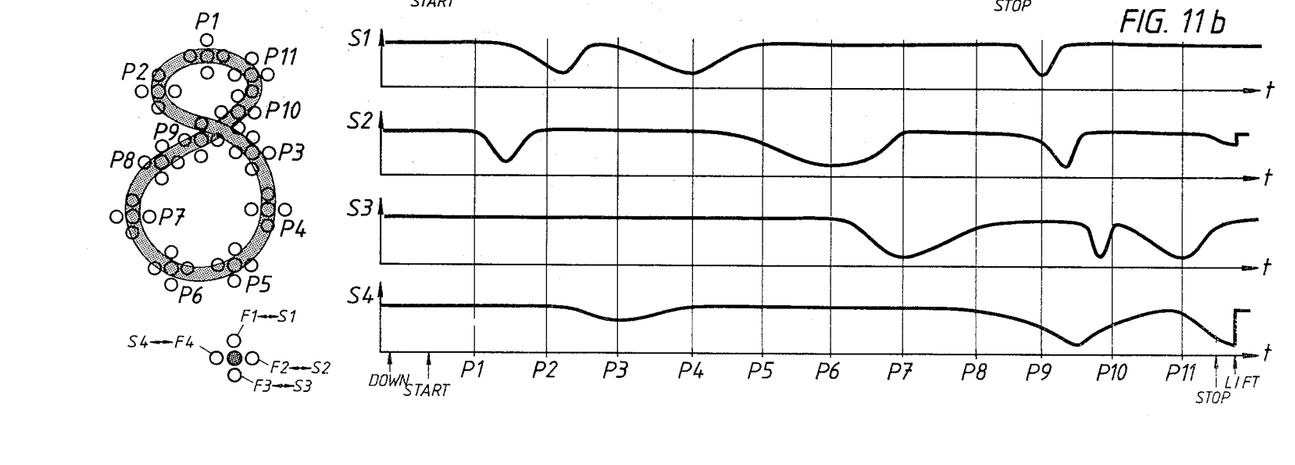

FIG. 11a shows the characteristics of the signals S1-S4 when a figure three is drawn and FIG. 11b, when a figure eight is drawn. P1-P8 indicate eight arbitrarily chosen positions along the marked "3". These positions are indicated on the enlarged three shown in FIG. 11a. In the same way, P1-P11 indicate eleven positions along a marked figure eight in FIG. 11b. In each Figure, DOWN indicates the time when the marking member is placed onto the material, START indicates the time when the marking begins, STOP indicates the time when the marking ends, and LIFT indicates the time when the marking member is lifted from the material 3.

Figure 12:
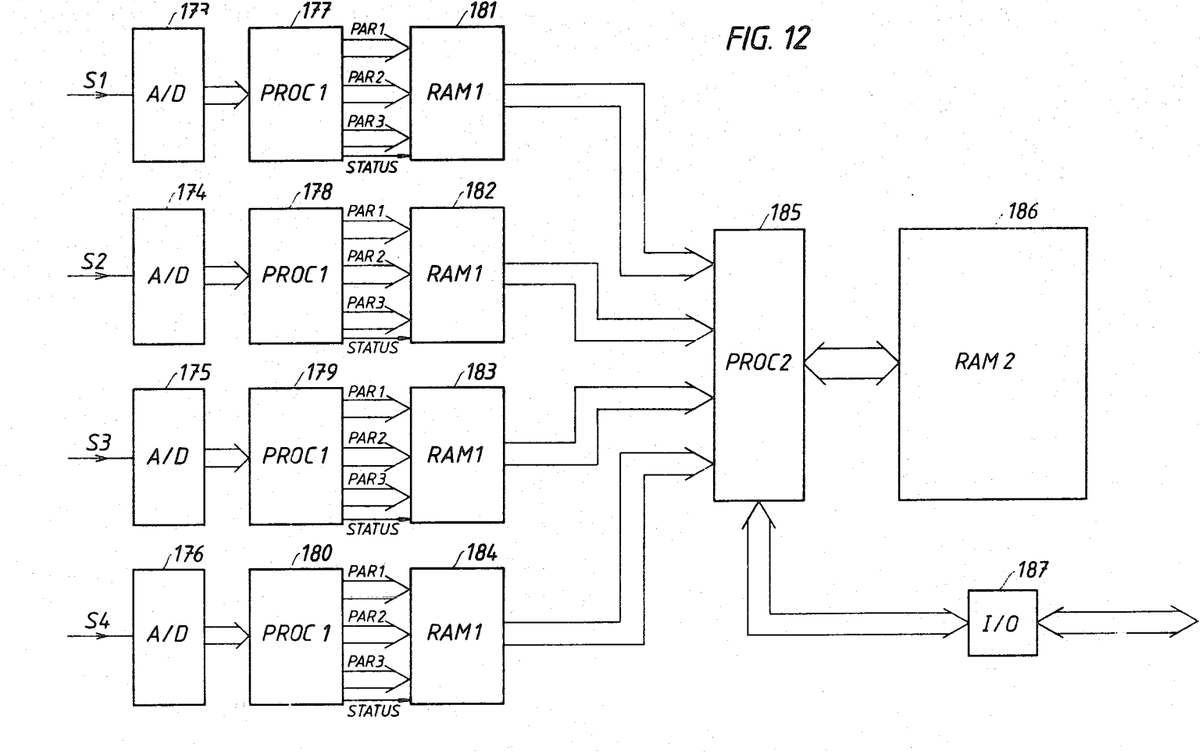

To analyze the signals S1-S4, with the object of identifying the figure, letter or symbol being drawn, an electronic architecture according to FIG. 12 can be used. The signals S1-S4 are analog-to-digital converted by devices 173-176. (In comparison with the device according to FIG. 10, no parallel/series conversion is made in this case.) The digital values are taken care of by one processor PROC1 (177-180) per signal. This parallelism can be necessary for real time analysis of the drawn mark. The processors 177-180 are identical and extract from the signals special characteristics as, for example, times for signal minima, depth and width of signal minima, and possibly times for start and stop of the marking. For the latter, an extra signal S5 (see FIG. 10), may be required. The parameters of the characteristics of the signals are successively stored in memories RAM1, (181-184). When one figure, etc., has been drawn and the next has been started, a processor PROC2 (185) reads out the parameter values from the memories 181-184 and compares these with reference values which are stored in a memory RAM2 (186). When the drawn figure, etc., is identified, a signal representing this is emitted via an I/O unit 187, while at the same time the statistical variation of the set of parameters of the reference memory 186 can be updated.

In case of reference storage, the system operates in the same way, however with the difference that the drawn number, etc., has to be defined, for example, by information to the memory PROC2 from, for example, a computer (not shown) via the I/O unit 187. The reference storage may, of course, take place by the operator registering on the material 3 a predetermined character sequence stored in the memory RAM2 (186).

The devices according to the above may be varied in many ways within the scope of the following claims.

What is claimed is:
1. A device for the simultaneous generation and detection of a marking on a surface to be marked, comprising:
   at least two light sources for emitting non-identical emission spectra;
   first means for multiplexing said at least two light sources to radiate said surface with said non-identical emission spectra;
   at least one marking member for changing at least one optical property of the surface to be marked, said optical property being defined within at least two separated wavelength ranges of an optically detectable spectrum;
   sensor means for sensing said at least one optical property within said at least two separated wavelength ranges and producing respective detecting signals representative thereof;
   a computing unit responsive to said detecting signals for effecting the mark sensing to determine the direction of said marking relative to the orientation of said at least one marking member independently of at least one of the distance and inclination of said at least one marking member relative to the mark, ambient light, and optical transmission of signals representing said at least one optical property; and
   second means for demultiplexing said detecting signals to said computing unit in synchronous relationship with said first means for multiplexing.

2. A device according to claim 1, further comprising at least one optical fiber provided with at least one optical branch, whereby incident light from said light-emitting means is fed to said at least one optical fiber and that incident light reflected from the mark is input to said sensor means via said at least one optical fiber and said at least one optical branch.

3. A device according to claim 1, in which said computing unit includes an electronic circuit responsive to said detecting signals for measuring at least one of the width or intensity of the mark.

4. A device according to claim 1 wherein said computing unit includes means for forming quotients from said detecting signals.

5. A device for the simultaneous generation and detection of a marking on a surface to be marked, comprising:
- at least two light sources for emitting non-identical emission spectra;
- means for multiplexing the non-identical emission spectra from said at least two light sources to be incident on said surface;
- at least one marking member for changing at least one optical property of the surface to be marked, said optical property being defined within at least two separated wavelength ranges of an optically detectable spectrum;
- at least one optical sensor for sensing said at least one optical property within said at least two separated wavelength ranges and producing respective detecting signals representative thereof; and
- a computing unit responsive to said detecting signals for effecting the mark sensing operation to determine the direction of said marking relative to the direction of said at least one marking member independently of at least one of the distance and inclination of said at least one marking member relative to the mark, ambient light, and optical transmission of signals representing said at least one optical property.

* * * * *